(12) United States Patent
Biskeborn et al.

(10) Patent No.: US 6,256,157 B1
(45) Date of Patent: Jul. 3, 2001

(54) METHOD AND APPARATUS FOR REMOVING NOISE SPIKES

(75) Inventors: Robert G. Biskeborn, Hollister, CA (US); Eric R. Christensen, Tucson, AZ (US); David J. Seagle, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/079,903

(22) Filed: May 15, 1998

(51) Int. Cl.[7] .................................................. G11B 27/36
(52) U.S. Cl. ............................. 360/31; 360/46; 327/310; 327/311
(58) Field of Search ................................. 360/31, 46, 53, 360/67; 386/76, 114; 327/310, 551, 311; 375/254, 278

(56) References Cited

U.S. PATENT DOCUMENTS

| 4,204,170 | 5/1980 | Kage | 328/165 |
|---|---|---|---|
| 4,254,483 | 3/1981 | Vidovic | 367/94 |
| 4,317,142 | 2/1982 | Wray | 360/67 |
| 4,342,059 | 7/1982 | Wray | 360/123 |
| 4,591,710 | 5/1986 | Komadina et al. | 250/221 |
| 4,914,398 * | 4/1990 | Jove et al. | 360/46 |
| 4,931,743 * | 6/1990 | Fukuda et al. | 327/551 |
| 4,994,767 * | 2/1991 | Hawkes | 332/123 |
| 5,446,539 * | 8/1995 | Minakawa | 386/114 |
| 5,625,320 | 4/1997 | Hagerty | 330/2 |

* cited by examiner

Primary Examiner—Regina Y. Neal
(74) Attorney, Agent, or Firm—Altera Law Group, LLC

(57) ABSTRACT

A method and apparatus is disclosed for reducing electrical noise from noise spikes in an electrical information signal. The invention can provide protection of a data storage system from soft errors rate due to noise spikes appearing in the signal from the input transducer. A cancellation signal for the low frequency component (i.e. in the system bandwidth) of the noise signal is generated. The cancellation signal is derived from a frequency band that appears in the noise spike, but does not appear in the system bandwidth for the information signal. The cancellation signal is generated in the preferred embodiment by a cancellation signal generator comprising a high pass filter and a mixer. The mixer generates a cancellation signal by processing the high frequency portion using a waveform above the normal high frequency cutoff to reconstitute the low frequency component of the noise spike in the normal frequency band. Then, the cancellation signal and the delayed input signal are combined to reduce or remove the low frequency component of the noise spike. The remaining frequency components of the noise spike can easily be removed since they are outside of system bandwidth. The invention is particularly useful in a storage system having MR heads.

21 Claims, 8 Drawing Sheets

METHOD AND APPARATUS FOR REMOVING NOISE SPIKES

BACKGROUND OF THE INVENTION

1. Field of the Invention

This invention relates in general to noise suppression, and more particularly to a method and apparatus for removing noise spikes from an input transducer (head) in a storage system.

2. Description of Related Art

Magnetic data is increasingly stored at higher and higher densities which in turn require increases in the sensitivity of the transducers (heads) used to read the recorded signals. Noise reduction and cancellation likewise becomes more important as sensitivity of the heads increases. Recently, a previously unreported phenomenon associated with data readback has been identified that detrimentally affects the error rate in a data storage system. Errors in data readback have been identified to be caused by very sharp spikes at the input (channel) preamplifier. The sharp spikes are of electrical origin and have been observed in systems using MR heads. The spikes which can be considered to be impulse noise are very narrow in width and broad in spectral content, can be of either polarity and are distributed over a wide range in amplitude.

The effect of the sharp spikes in the input channel signal is randomly dispersed single bit errors. This effect is intermittent and can degrade the soft error rate to unacceptable levels. In fact, spikes above a certain amplitude have sufficient energy in the bandwidth of the recording channel to interfere with detection of the media signal. The precise origin of these spikes is not well understood. It appears that they can occur in the absence a recording signal or MR bias current, but appear to require media/head contact and their relative motion.

FIG. 8 illustrates a graph 800 of a set of noise spikes 802 detected on a DC erased track with an oscilloscope set to persistence mode and a positive trigger level. Note that the noise spikes 802 are identical in structure, i.e., they have substantially the same pulse width 810, but vary greatly in amplitude 812.

As a result of such phenomenon, a number of tracks on head arrays may suffer seriously degraded error rates. Problem tracks are randomly distributed on heads, and the problem is intermittent with random increase and decreases in the occurrence of the phenomenon. In addition, problem tracks have shown noise spikes with some media and not with others.

FIG. 9 illustrates a graph 900 of an noise spike 910 corrupting a channel signal 920 in a low end system. As in the high end, the noise spikes 910 are identical in structure, but vary greatly in amplitude. Here too the noise spikes 910 may be found to have a positive and negative (not shown) polarity and to be intermittent.

Since noise spikes are not written to the tape during the recording process, data integrity is not in question. Typical error correction schemes normally can handle single bit randomly distributed errors in readback. However, there are times when the density of errors is so great that data rereads would be required, which would degrade performance. In a worst case, heads or drives may have to be replaced in the field to attempt to eliminate the problem.

It can be seen then that there is a need for an improvement to prevent errors if and when the spikes occur.

SUMMARY OF THE INVENTION

To overcome the limitations in the prior art described above, and to overcome other limitations that will become apparent upon reading and understanding the present specification, the present invention discloses a method and apparatus for removing electrical noise spikes from a signal containing information such as a signal read from the media in a data storage device.

The present invention protects a data storage system, such as a tape or disk drive, from a degraded soft error rate due to electrical spikes in the signals coming from the head.

A method in accordance with the principles of the present invention includes extracting the high frequency component of the noise spike above a normal high frequency cutoff for the system, generating a cancellation signal for the low frequency component of the noise spike using the high frequency component and combining the cancellation signal with the appropriately delayed input signal to remove or reduce the noise spike in the input signal. The cancellation signal may be generated with the opposite polarity from the noise spike or it may be inverted after it is generated so that it can be summed with the raw input signal. A cancellation signal with the same polarity of the noise spike may be used to drive a differential amplifier along with the raw input signal to subtract the cancellation signal.

The invention can be embodied in analog or digital circuitry or a combination thereof. The circuitry is designed to identify the time that a spike occurs along with the amplitude and polarity of the spike which are then used as parameters in generating the cancellation signal.

One embodiment in accordance with the present invention includes a high pass filter, a mixer and circuitry for combining a cancellation signal and the raw signal. The high pass filter removes the low frequency component of the raw signal which is a composite of the information signal and a noise spike. The noise spike has a spectral content above the normal operating frequency bandwidth of the system. Output from the high pass filter determines the timing of the spike. The mixer regenerates the low frequency portion of the noise spike by mixing the output of the high pass filter with an internally generated signal (such as a sinusoidal wave) selected to generate a spectral component (a lower sideband) which can either be used as the cancellation signal or from which the cancellation signal is derived by further processing such as amplitude adjustment. The cancellation signal is the reconstruction of the low frequency component of the spike in the normal operating bandwidth. The mixer acts to shift the frequencies in the high frequency portion of the noise spike downward while preserving the timing and amplitude information. Any standard frequency shifting components or apparatus, whether analog or digital, can be used to achieve this downward shift if the timing and amplitude information is preserved. There will typically be other higher frequency spectral components in the output of the mixer, but since these are above the normal frequency cutoff of the system, they can be removed by a low pass filter. A differential amplifier or other combining device is used to combine the delayed raw input signal and the cancellation signal to obtain the adjusted signal in which the noise signal has been removed or subtracted from the information signal. The raw input signal is delayed to match the delay introduced by the circuitry which generates the cancellation signal.

Although the invention is well suited for use in data storage systems, it can be applied in any signal processing application subject to similar noise spikes whose spectra similarly overlap the input band of the system.

BRIEF DESCRIPTION OF THE DRAWINGS

Referring now to the drawings in which like reference numbers represent corresponding parts throughout.

DETAILED DESCRIPTION OF THE INVENTION

In the following description of an exemplary embodiment, reference is made to the accompanying drawings which form a part hereof, and in which is shown by way of illustration a specific embodiment in which the invention may be practiced. It is to be understood that other embodiments may be utilized as structural changes may be made without departing from the scope of the present invention.

The present invention provides a method and apparatus for preventing errors from noise spikes of electrical origin by removing the noise spike from the signal.

Figure 1:
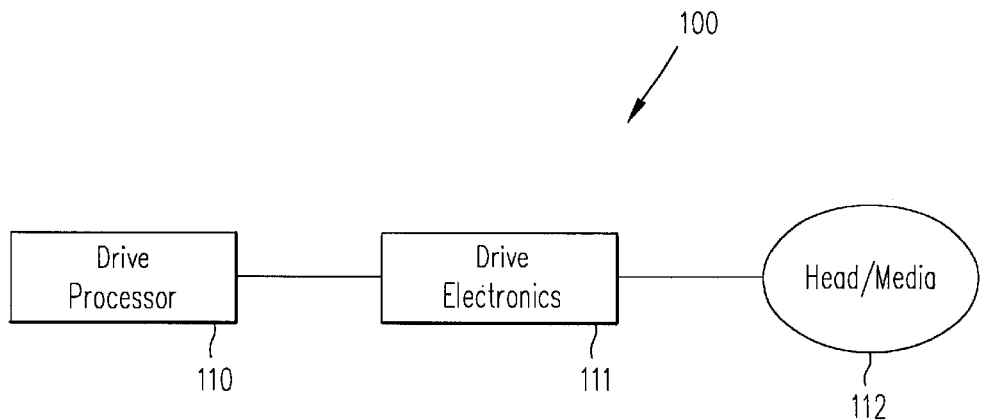
FIG. 1 illustrates a data storage system according to the present invention.

FIG. 1 illustrates a conventional data storage system 100 wherein a processor 110 is coupled to the drive electronics 111, which is in turn coupled to a head which reads signals from the magnetic media. The head/media 112 is shown as a unit in FIG. 1. What are sometimes called the channel electronics are shown as being included within the drive electronics 111. The system is shown generically, since the invention can apply to a range of storage systems including tape and disk drives. The invention relates to the functioning of the drive electronics in such a system. The invention applies equally in systems with multiple processors where the functions are divided into subunits.

Data being transferred to or from the media is subject to errors for many reasons. For example, there may be defects at locations on the storage media. These defects typically induce "hard" errors, which are errors that persist on every re-read of the defective location. There are also "soft" errors, which tend not to persist. Soft errors have many possible sources, including the above-mentioned noise spikes.

Figure 2:
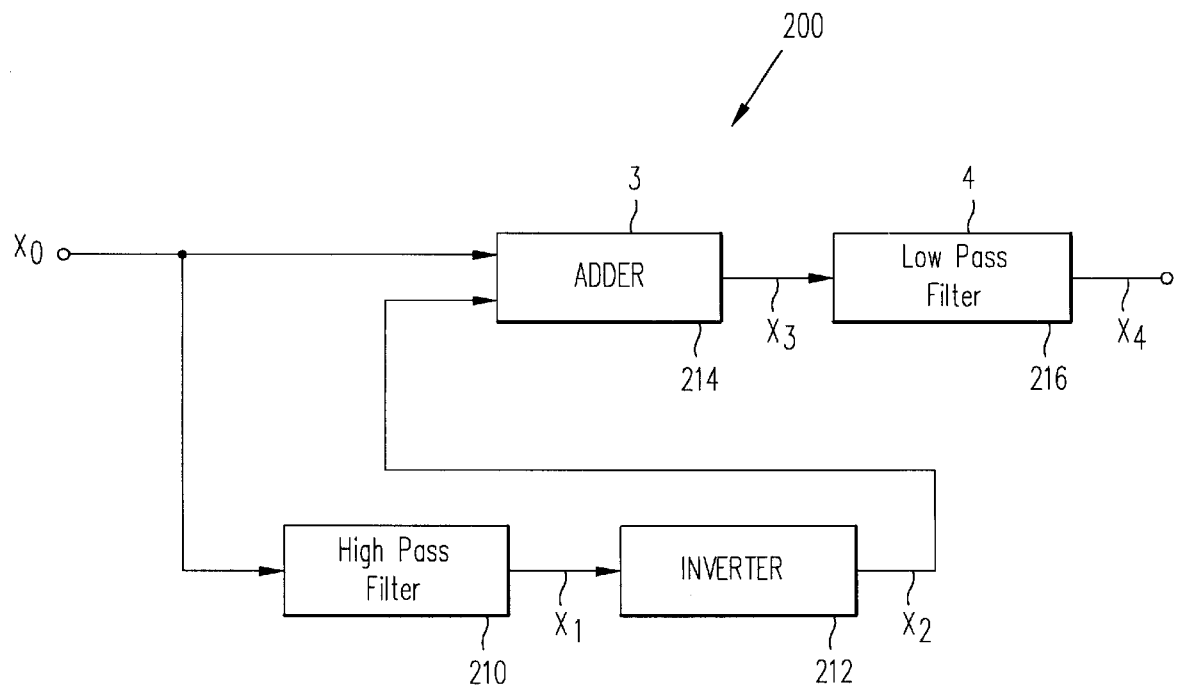
FIG. 2 illustrates a circuit that has previously been used to remove a spike noise component from an input signal.
Figure 3A:
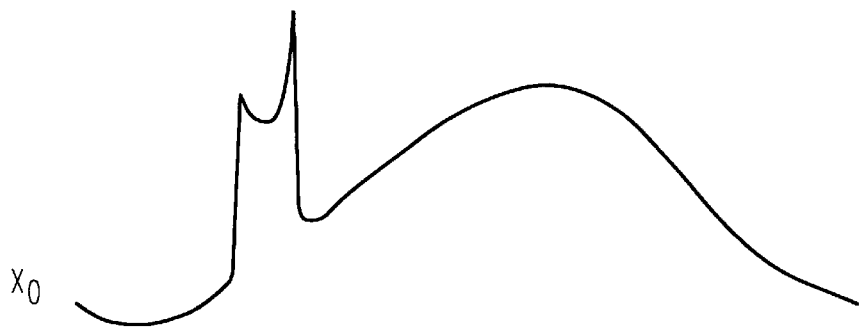
FIGS. 3a–e illustrate signal waveforms at points in the circuit of FIG. 2.
Figure 3B:
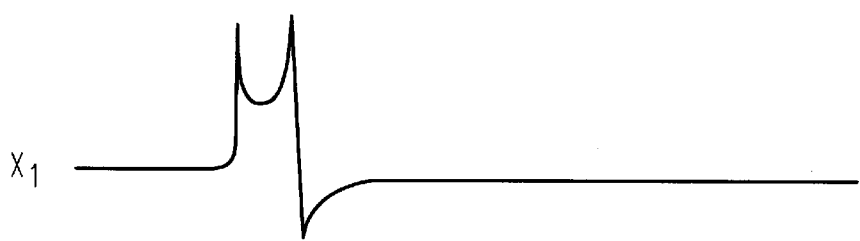
Figure 3C:
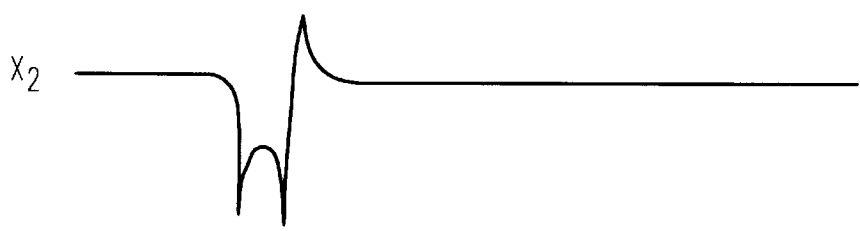

FIG. 2 illustrates a circuit 200 that has previously been used to remove a noise component from an input signal. The circuit in FIG. 2 will be described with reference to the waveforms in FIGS. 3a to 3e. In FIG. 2, a high-pass filter 210 extracts only an impulse noise component. The cut-off frequency of this filter 210 is selected at a sufficiently high frequency to prevent the signal component from being removed. With such provision the extracted impulse noise $X_1$ as shown in FIG. 3b is somewhat different from the impulse noise contained in the input signal $X_0$ as shown in FIG. 3a. Inverter 212 inverts the extracted impulse noise $X_1$, and the output $X_2$ of this inverter 212 (shown in FIG. 3c) and the input signal $X_0$ are added to each other by means of an adder circuit 214 (for example, an operational amplifier).

Figure 3D:
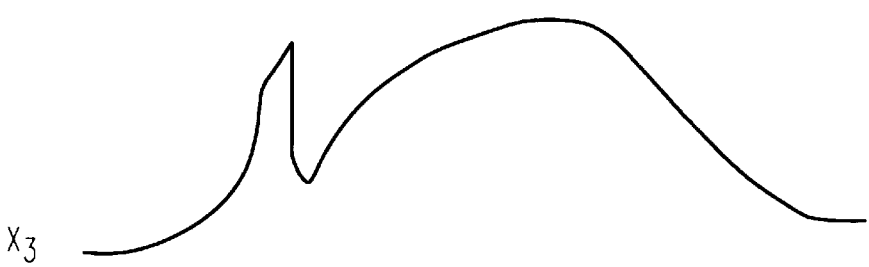
Figure 3E:
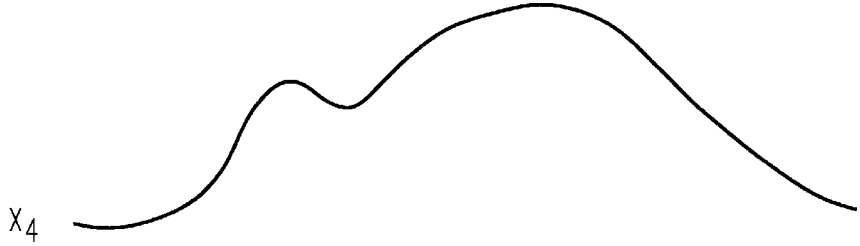

The output $X_3$ of the circuit 214 has residual impulse noise as shown in FIG. 3d. The waveform $X_3$ is then passed through a low-pass filter 216 for further removing the residual noise component. However, the effect of the impulse noise in the output $X_4$ of the filter 216 still remains as shown in FIG. 3e. According to this method, the larger the impulse noise, the greater is the effect of the impulse noise at the output $X_4$.

Before describing the present invention, the parameters of the system will first be defined. A first frequency, $F_1$, is defined as the normal high frequency cutoff (bandwidth edge) for detecting the media input signal and will vary according to the particular design of the storage system. A second frequency, $F_2$, is greater than $F_1$. Selection of $F_2$ is not critical, so $F_2$ may nominally be twice $F_1$, but is actually bounded on the low side by $F_1$ and noise considerations. On the high side $F_2$ is limited by the spike noise bandwidth and the transfer functions of the initial stages of the system.

There are several factors regarding the noise spikes that need to be noted. First, when filtered through a band pass filter from low frequency cutoff to $F_2$, all the spikes have a similar waveform with the exception of amplitude and sign. Therefore, information about the amplitude, sign and time of the spike are essentially sufficient to define this type of noise.

Figure 4:
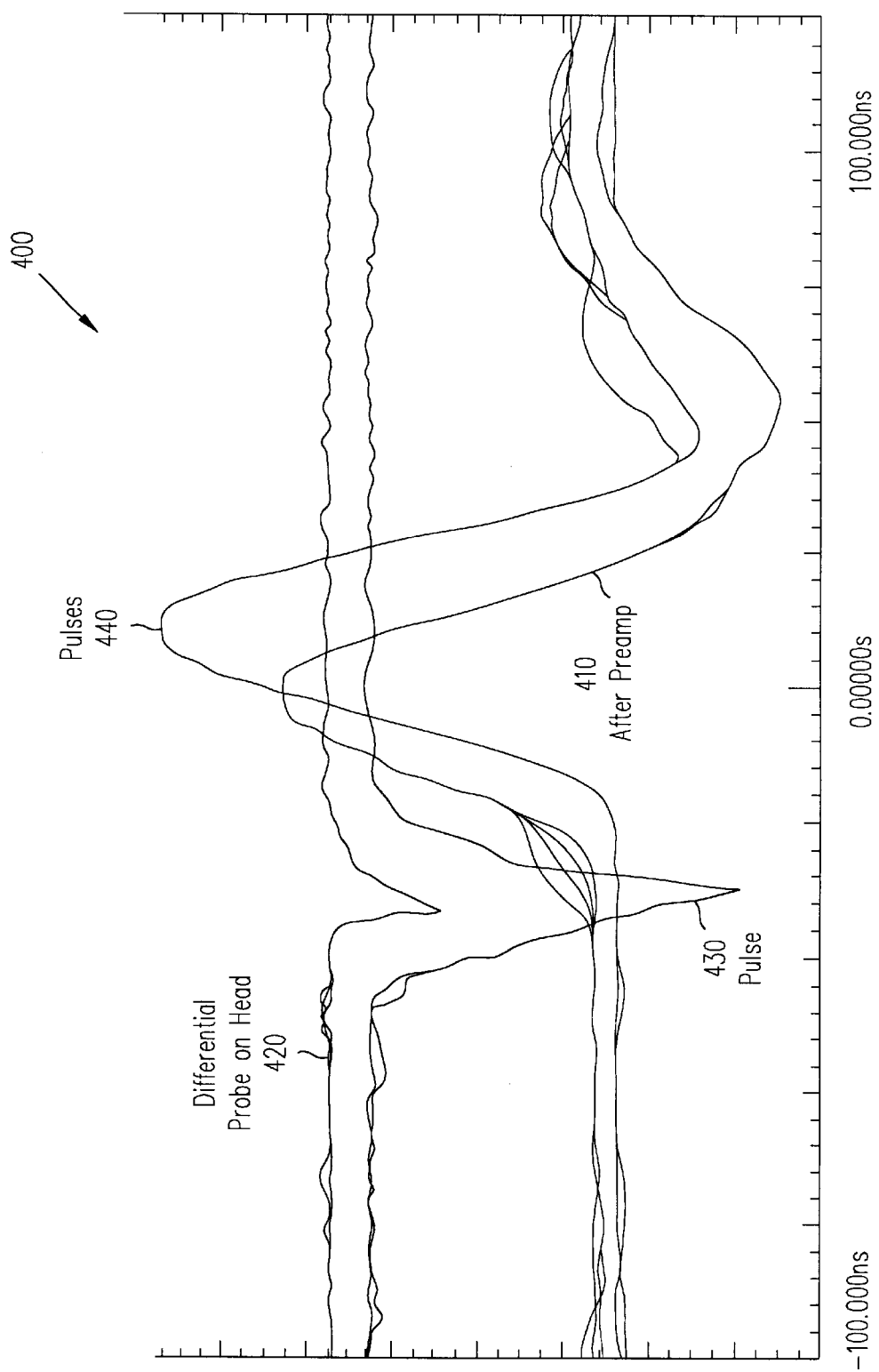
FIG. 4 illustrates a first set of traces of the spikes after the preamp of the drive and a second set of traces, of the same pulses, detected simultaneously by a differential probe on the head.

FIG. 4 illustrates a set of traces 400 of the noise spikes. The traces 400 include a first set of traces 410 after the preamp of a drive and a second set of traces 420, of the same pulses, detected simultaneously by a differential probe on the head. The narrow pulse 430 at the head has a spectral distribution which is large and constant over the bandwidth of the preamp. Thus, the pulses 440 at the preamp are simply the impulse response of the amplifier determined by the transfer functions of its low and high pass filters.

Secondly, there is a substantial spectral component of each spike 430 between $F_1$ and $F_2$. Referring to the second trace 420, the spike 430 is much narrower than the recording pulse. In general there will be spectral content in the spike 430 above the normal high frequency cutoff of the system's input channel, i.e. the upper boundary for information in the signal.

In the range of $F_1$ to $F_2$, fly height and gap losses for typical magnetic storage systems are so great there is negligible media signal. Thus the distortion in the bandwidth caused by the spike can be separated from the signal by observation of the spectrum between $F_1$ and $F_2$.

Figure 5:
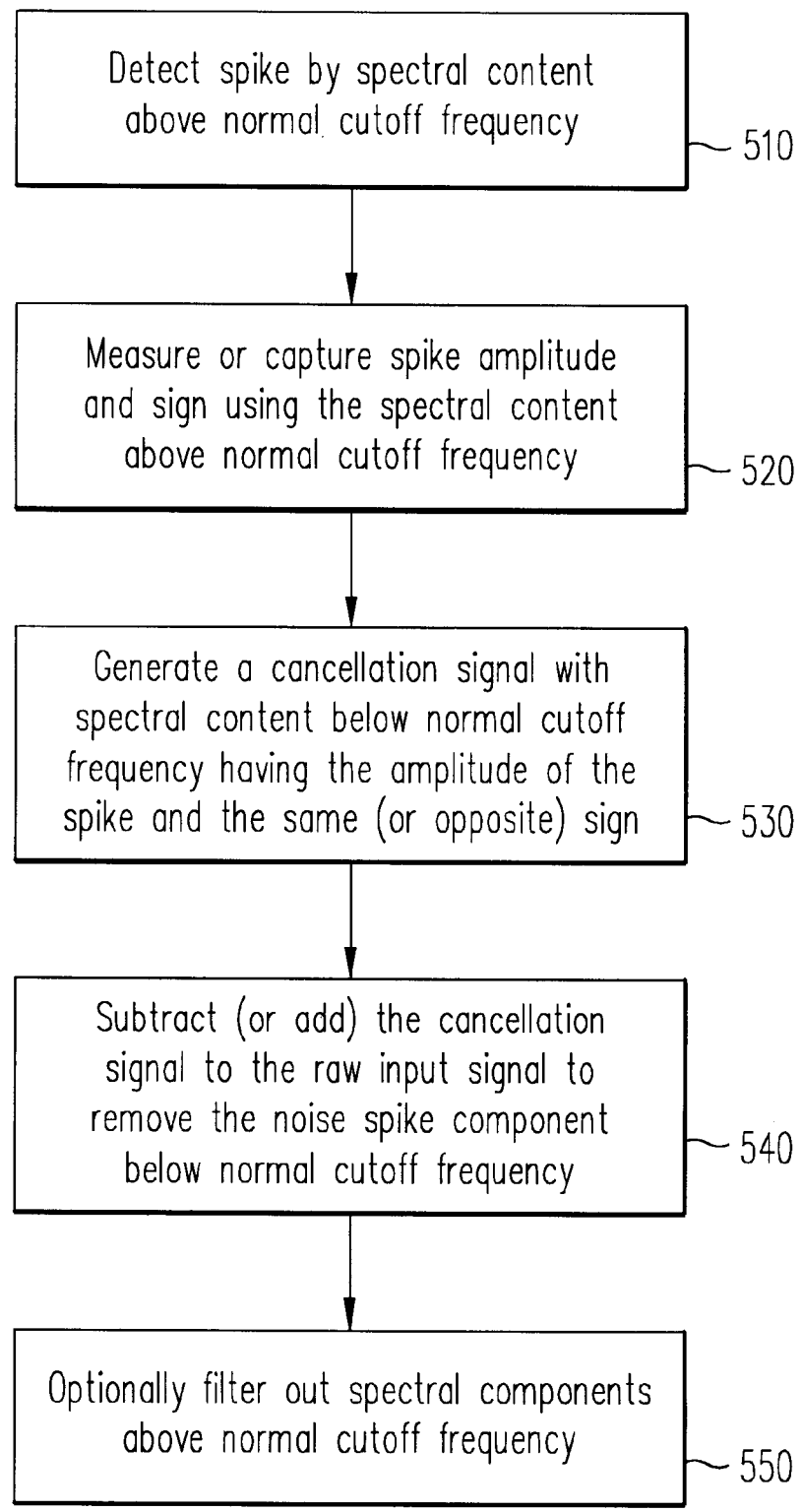
FIG. 5 illustrates a flowchart of the method for correcting errors from noise spikes according to the invention.

FIG. 5 illustrates a flowchart of a method for preventing errors from noise spikes. The presence of a spike is detected by its spectral content in a range above the normal cutoff frequency 510. This detection determines the timing of the spike. The other necessary parameters, i.e., amplitude, and sign of the spike are determined, measured or captured 520. Then the three parameters are used to generate a cancellation pulse in the frequency band up to $F_1$, but without the media signal, i.e., without the information 530. Finally, the portion of the noise spike in the system bandwidth is reduced or removed from the raw input signal by subtracting the cancellation pulse from the raw input signal 540. The adjusted signal may have components above $F_1$ which may be removed in the normal course of conventional processing, but optionally these unnecessary components can be filtered out at this point 550. This method can be practiced using analog or digital techniques.

Figure 6:
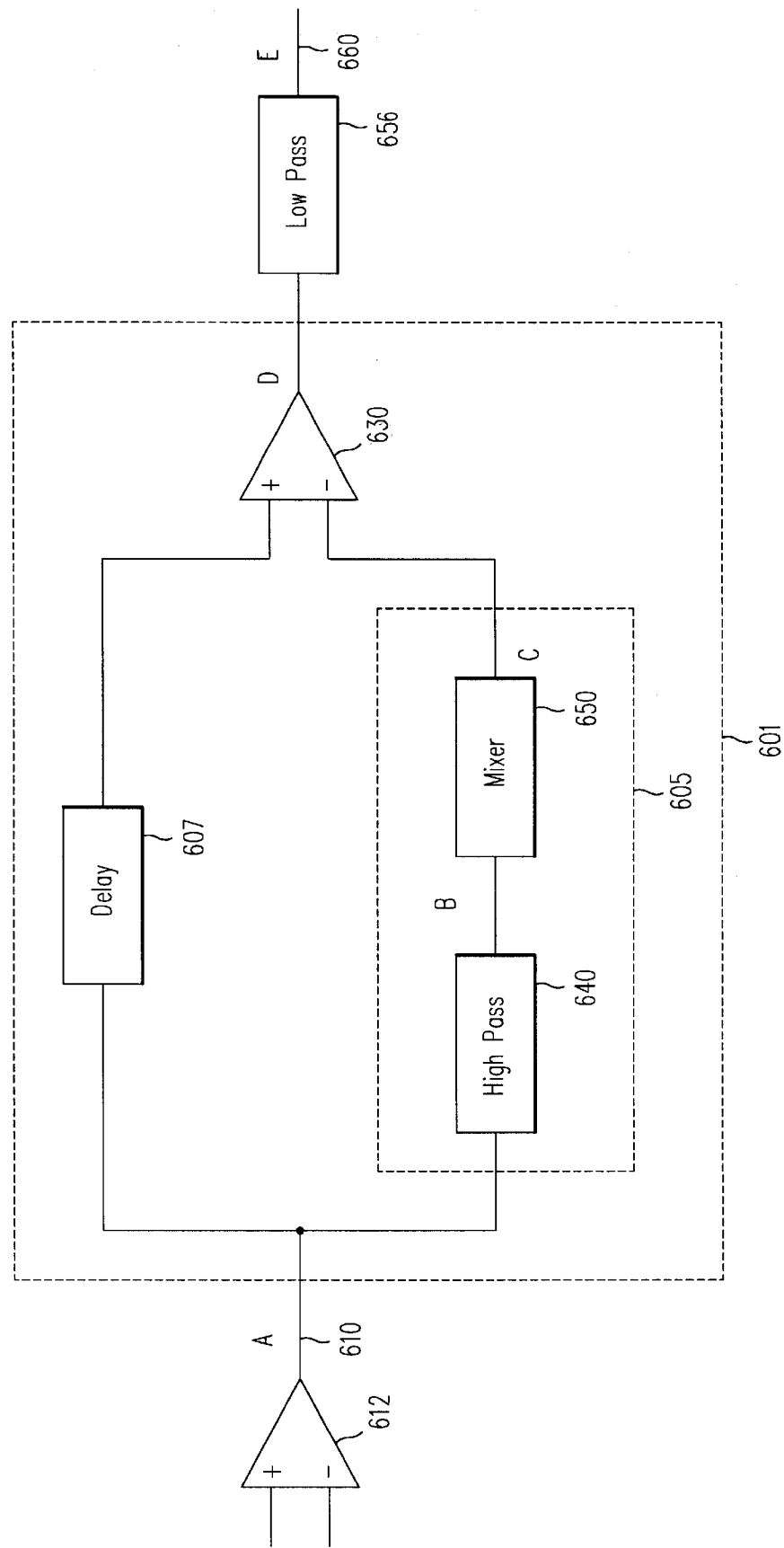
FIG. 6 illustrates a circuit for preventing errors from noise spikes according to the invention.

FIG. 6 illustrates one embodiment of an analog circuit 600 for removing noise spikes according to the present invention. (Note that use of digital signal processing components in an embodiment according to the invention will be straightforward according to the same principles as the analog implementation.) Preamplifier 612 and low pass filter 656 (also called the channel pass filter) may be directly connected in a standard data storage system. The additional signal processing components which comprise the spike noise cancellation unit 601 can be inserted between the preamplifier 612 and low pass filter 656. Other connection points for the spike noise cancellation unit can easily be determined given a specific system's electronics. The frequency components of the information signal exist from 0 to frequency $F_1$. Since the noise spike simulates an impulse in time, its frequency content is very wideband, however, normal recording channel electronics tend to limit upper frequencies. For this example, the upper frequency limit is shown to be at $F_2$.

Figure 7:
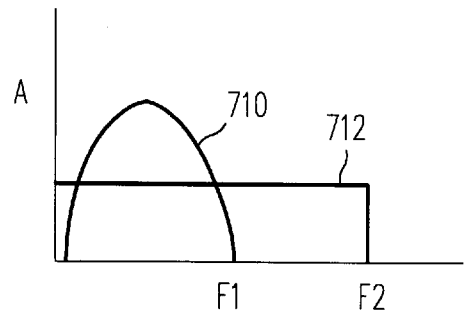
FIGS. 7a–e illustrate signal waveforms at points in the circuit of FIG. 6.
Figure 7:
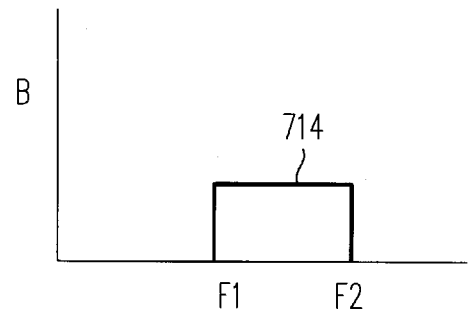
Figure 7:
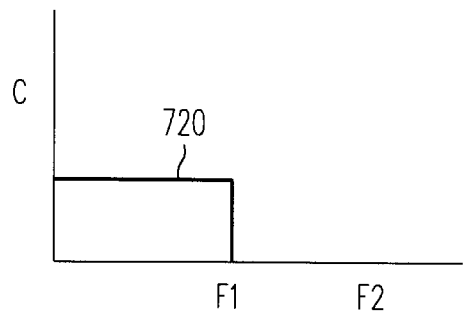
Figure 7:
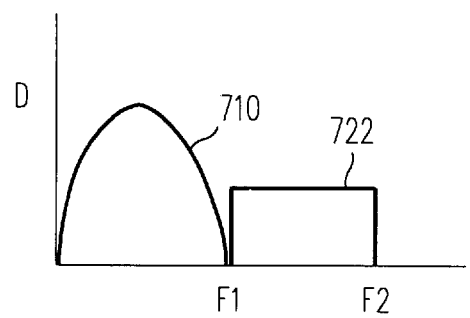
Figure 7:
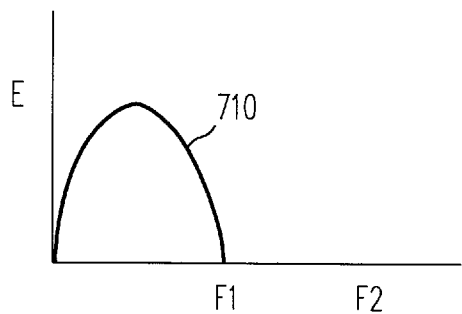
Figure 8:
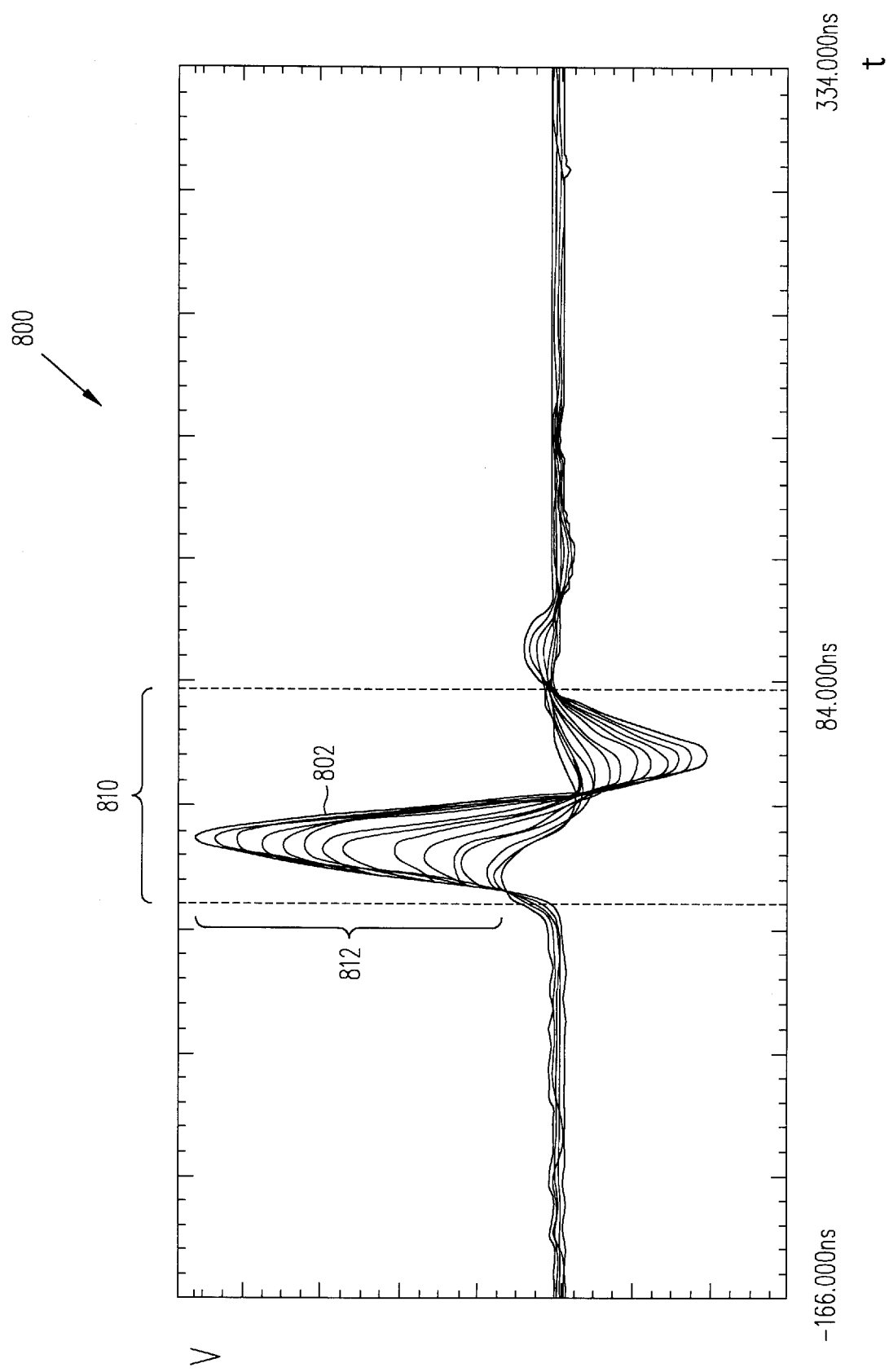
FIG. 8 illustrates a set of noise spikes detected on a DC erased track with an oscilloscope set to persistence mode and a positive trigger level.
Figure 9:
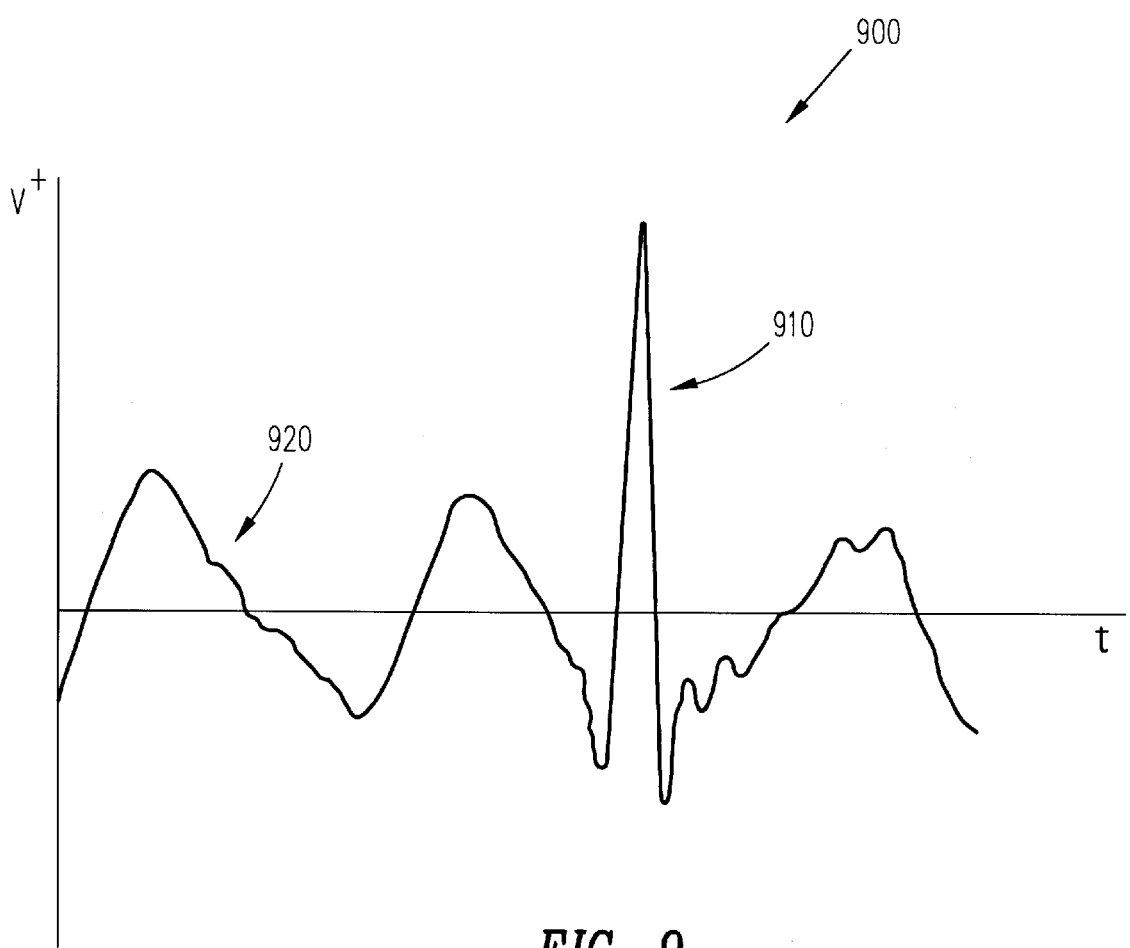
FIG. 9 illustrates an noise spike corrupting channel data in a low end system.

The output of preamplifier 612 becomes the raw input signal 610 which is directed along two paths to cancellation signal generator 605 and to delay unit 607. The output of the delay unit 607 is routed to the positive input of differential amplifier 630 which serves as a combining device. The output of the cancellation signal generator 605 is routed to the negative input of differential amplifier 630. The cancellation signal generator 605 is implemented in this embodiment with a high pass filter 640 and a mixer 650 connected in series. The high pass filter 640 removes the normal frequency band, i.e., the low frequency content which includes the information signal, from the raw input signal. The output of the high pass filter 640 is processed to generate or regenerate the spectral component of the noise spike in the normal frequency band of the system as shown in FIG. 7. In the preferred embodiment this regeneration is performed by the mixer 650 using a sinusoidal wave from a local oscillator. The mixer linearly modulates the high frequency portion of the spike with the sinusoidal wave in the standard way and generates an output signal with upper and lower sidebands as is well known. The frequency of the sinusoidal wave is selected to generate a lower sideband with a spectral component in the normal frequency band of the system when mixed with the high frequency portion of the raw input signal. The mixer is used to convert or shift the $F_1$–$F_2$ frequency band down to frequencies (0–$F_1$) that exist in the information signal bandwidth. Modulating the spike at frequency $F_1$ accomplishes this task with minimum timing shift. Other frequencies can be used, but might require additional compensation. The filtering and modulation results are illustrated in FIG. 7. It should be noted that the information on the time, amplitude and sign (polarity) of the spike are preserved throughout the entire spike extraction process even though transformations in some or all of these parameters will occur. The information on the parameters of the noise spike as reflected in the output of the high pass filter 640 will be preserved in the lower sideband in the output of the mixer. This lower, and now reflects the three parameters for the spike: time, amplitude and sign even though the amplitude may have been scaled and the spike has been delayed. This lower sideband is in effect the regenerated low frequency content of the noise spike (i.e., the cancellation signal) which can then be subtracted from the input signal after appropriate adjustments are made.

The amplitude of the cancellation signal may need to be scaled up or down to more closely match the amplitude of the spike in the system bandwidth frequencies in the delayed input signal. There may be fixed amplitude losses (or gains) incurred during the filtering and mixing stages. The fixed losses can easily be compensated for by an amplifier on the output of the mixer. However, there may other reasons for adjusting the amplitude of the cancellation signal. For example, for a noise spike which closely approximates an infinitely narrow pulse, the amplitude of the noise below the system cutoff frequency will be substantially equal to the amplitude of the noise after high pass filtering. If the spikes in a particular system deviate from this model, then the amplitudes of the noise signal above and below $F_1$ may be different. The functional relationship between the amplitudes in the two bands can be reflected in the transfer characteristics of the amplifier on the output of the mixer or in other parts of the circuitry. For some applications it may also be desirable to dynamically adjust the amplitude of the cancellation signal in relation to the information signal to achieve maximum noise reduction using feedback based on the noise content of the output signal from the differential amplifier.

The preferred frequency for the modulation signal is substantially equal to or higher in frequency than the normal system cutoff frequency because of the lack of a time shift. Increasing the frequency of the modulation signal will shift the spectrum of the lower sideband upward accordingly. Since total cancellation of the noise spike is not feasible it is to be expected that fine tuning of the cancellation signal generator's parameters, e.g. the modulation frequency, amplitude, etc. will be performed for a particular embodiment to achieve acceptable levels of noise reductions.

In addition to the cancellation signal, the output of the mixer contains higher frequency components, i.e., the upper sideband. Since the upper sideband frequencies are above the system cutoff frequency they can easily be removed by low pass filtering. The output (Point C) of the mixer 650 is in effect inverted by being the negative input of the differential amplifier 630. By driving the positive input of the differential amplifier 630 with the delayed input signal and the negative input with the output of the mixer, a subtraction is performed. Other standard methods of obtaining a signal which is the difference or differential of two inputs can also be used. For example, a separate inverter followed by an adder could be used. The raw input signal is routed to the delay unit 607 is designed to match the time delay introduced by the cancellation signal generator 605 so that the timing of the spike noise in the output signal of the delay unit is substantially the same as the timing of the noise cancellation signal. The final step of the process the output of the differential amplifier at Point D is filtered by low pass filter 656 to produce the clean adjusted media signal 660 which contains the desired information without the noise signal. The low pass filtering may be performed by the normal channel low pass filter which is present in conventional systems or by a separate filter. Optionally the output of the mixer can be low pass filtered before being combined with the delayed input signal.

FIGS. 7a–e illustrates the spectra of various signals 700 at points within the circuit of FIG. 6. FIG. 7a, shows the spectrum of the media signal, i.e., the information signal, separated from the spectrum of the noise spike for purposes of explanation. In FIG. 7a, the media signal 710 has passed the broadband preamplification of the channel electronics at point A and contains a broad spectrum noise spike 712. The media signal 710 rolls off to zero by frequency $F_1$ while the noise spike 712 has spectral content which overlaps with the media signal 710 below $F_1$, and spectral content out to the preamplifier cutoff $F_2$. The combined media signal and the noise spike will be called the raw input signal.

FIG. 7b illustrates that the input signal has been filtered at point B and only the waveform of the upper portion 714 of the spectrum of the noise spike is left. The spectrum of waveform 714 is shown with a very sharp low frequency cutoff. Those skilled in the art will recognize that a high pass filter will have a rolloff slope which depends on the specific filter design. In FIG. 7c, shows the result of mixing the waveform 714 with the selected high frequency sinusoidal wave to obtain waveform 720 which is the spectral content of the noise spike reconstructed in the normal frequency band for the media. The mixer output may also include spectral content above $F_2$. FIG. 7d illustrates the result of waveform 720 being subtracted from the raw input signal at point A. FIG. 7d shows the spectrum at point D of the circuit in FIG. 6. The point D result shows three distinct bands in the spectrum. The media signal 710 in the low frequency band below is now distinctly separated. Waveform 722, which is the uncancelled portion of the noise spike, remains at point D. FIG. 7e then illustrates the isolated media signal 710 at point E after waveform 722 has been removed by a low pass filter.

Those skilled in the art will recognize that there can be many implementations of this invention with various tradeoffs in performance and complexity, e.g., the invention could be implemented using analog, digital or analog/digital techniques and components.

The foregoing description of an exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for removing a noise spike in an input signal in a system with a high frequency cutoff for information in the input signal comprising the steps of:

extracting a high frequency spectral component of the noise spike above the high frequency cutoff for a media;

generating a cancellation signal having the spectral content of the noise spike reconstructed in a normal frequency band for the media, the cancellation signal being a function of an amplitude and sign of a high frequency component of the noise spike above the high frequency cutoff;

delaying the input signal by an amount approximately equal to a delay in the cancellation signal due to the generating steps, the delaying resulting in a delayed input signal; and combining the cancellation signal with the delayed input signal to reduce a low frequency spectral component of the noise spike.

2. The method of claim 1 wherein
    the step of extracting the high frequency component of the noise spike further comprises filtering the input signal containing the noise spike through a high pass filter; and
    the step of generating the cancellation signal further comprises mixing the high frequency component with a waveform which is substantially equal to or higher in frequency than the high frequency cutoff.

3. The method of claim 2 further comprising the step executed before the combining step of adjusting an amplitude of the cancellation signal to approximately match an amplitude of the low frequency component of the noise spike.

4. The method of claim 2 wherein the cancellation signal is derived from a sideband component resulting from the mixing step.

5. The method of claim 1 wherein the input signal comes from an MR head in a magnetic data storage device.

6. An apparatus for processing an input signal, the input signal having a high frequency cutoff for information in the input signal, comprising:

a cancellation signal generator which generates a cancellation signal having a high frequency spectral component of a noise spike reconstructed in a normal frequency band for a media and having an amplitude and sign which are a function of the high frequency spectral component of the noise spike;

a delay unit which delays the input signal to match a delay introduced by the cancellation signal generator, the output of the delay unit being a delayed input signal; and differential circuitry which subtracts the cancellation signal from the delayed input signal.

7. The apparatus of claim 6 differential circuitry further comprises a differential amplifier.

8. The apparatus of claim 6 wherein the cancellation signal generator further comprises:

a high pass filter for filtering the input signal containing an noise spike the high pass filter passing a high frequency component of the noise spike above the high frequency cutoff; and a mixer, including a local oscillator which generates a waveform with a frequency equal to or higher than the high frequency cutoff, and which mixes the high frequency component with the waveform.

9. The apparatus of claim 6 wherein the cancellation signal generator further comprises a mixer, including a local oscillator which generates a waveform with a frequency approximately equal to the high frequency cutoff.

10. The apparatus of claim 6 wherein the input signal is generated by an MR head.

11. The apparatus of claim 6 further comprising an amplifier which adjusts an amplitude of the cancellation signal ahead of the differential circuitry.

12. A storage system, comprising:

a transducer for reading an input signal from a storage medium;

a cancellation signal generator which generates a cancellation signal having a high frequency spectral component of the noise spike reconstructed in a normal frequency band for a media and having an amplitude and sign which are a function of a high frequency spectral component of a noise spike in the input signal;

a delay unit which delays the input signal to match a delay introduced by the cancellation signal generator, the output of the delay unit being a delayed input signal; and differential circuitry, which subtracts the cancellation signal from the input signal.

13. The storage system of claim 12 further comprising a low pass filter for removing high frequency components introduced by the cancellation signal generator above the high frequency cutoff.

14. The storage system of claim 12 wherein the transducer includes an MR element.

15. The storage system of claim 14 wherein the storage system is a tape drive.

16. The storage system of claim 14 wherein the storage system is a disk drive.

17. The storage system of claim 12 wherein the cancellation signal generator further comprises a high pass filter for filtering the input signal, the high pass filter passing a high frequency component of the noise spike above the high frequency cutoff; and a mixer, including a local oscillator which generates a waveform with a frequency approximately equal to or higher than the high frequency cutoff, which mixes the high frequency component with the waveform.

18. The storage system of claim 17 wherein the waveform is sinusoidal wave.

19. The storage system of claim 12 further comprising an amplifier which adjusts an amplitude of the cancellation signal ahead of the differential circuitry.

20. A storage system, comprising:

a transducer for reading an input signal from a storage medium which moves relative to the transducer, the transducer including at least one magnetoresistive (MR) element;

means for generating a cancellation signal having a high frequency spectral component of the noise spike reconstructed in a normal frequency band for information in the input signal, the cancellation signal having an amplitude and sign which are a function of a high frequency spectral component of a noise spike in the input signal;

a delay unit which delays the input signal to match a delay introduced by the means for generating a cancellation signal, the output of the delay unit being a delayed input signal; and means for combining the cancellation signal and the delayed input signal to reduce the amplitude of the noise spike.

21. The storage system of claim 20 wherein the means for generating a cancellation signal further comprises a frequency shifting means which shifts a frequency band of the noise spike into a bandwidth of the storage system for use in generating the cancellation signal.

* * * * *